United States Patent [19]
Kaveney et al.

[11] Patent Number: 5,655,798
[45] Date of Patent: Aug. 12, 1997

[54] DOOR HOLD-OPEN LATCH RELEASE AND METHOD

[75] Inventors: John R. Kaveney, East Peoria; James L. Nicholls, Mt. Zion; Joseph A. Rapp, Morris, all of Ill.

[73] Assignee: Caterpillar Inc., Peoria, Ill.

[21] Appl. No.: 438,857

[22] Filed: May 10, 1995

[51] Int. Cl.$^6$ ............................................. E05C 9/00
[52] U.S. Cl. .................. 292/3; 292/336.3; 292/DIG. 3; 292/DIG. 23; 292/153
[58] Field of Search .................. 292/3, DIG. 19, 292/DIG. 23, 153, DIG. 3, DIG. 25, 336.3; 70/DIG. 65

[56] References Cited

U.S. PATENT DOCUMENTS

| | | | |
|---|---|---|---|
| H358 | 11/1987 | Kaveney, Jr. | 292/216 |
| 589,811 | 11/1897 | Brown, Jr. | 292/117 |
| 917,448 | 4/1909 | Johnson | 292/117 |
| 3,094,352 | 6/1963 | May | 292/336.3 |
| 3,656,787 | 4/1972 | Coopersmith | 292/79 |
| 3,747,273 | 7/1973 | Johnson | 49/394 |
| 4,035,016 | 7/1977 | Ricca | 296/28 |
| 4,049,305 | 9/1977 | Zetterlund et al. | 292/336.3 |
| 4,062,577 | 12/1977 | Butterfield | 292/262 |
| 4,078,779 | 3/1978 | Molders | 267/120 |
| 4,181,337 | 1/1980 | Muller | 292/271 |
| 4,218,083 | 8/1980 | Dillemuth | 292/262 |
| 4,315,646 | 2/1982 | McReynolds | 292/68 |
| 4,335,911 | 6/1982 | Taylor | 292/262 |
| 4,339,844 | 7/1982 | Shatters | 16/82 |
| 4,552,392 | 11/1985 | Morello | 292/181 |
| 4,609,216 | 9/1986 | Baker et al. | 292/262 |
| 4,763,934 | 8/1988 | Kaveney, Jr. | 292/21 |
| 4,854,233 | 8/1989 | Despot et al. | 101/216 |
| 5,230,544 | 7/1993 | Morritt et al. | 296/65.1 |
| 5,286,073 | 2/1994 | Ui | 292/216 |

FOREIGN PATENT DOCUMENTS 2 383 296  10/1978  France .

*Primary Examiner*—Steven N. Meyers
*Assistant Examiner*—Donald J. Lechier
*Attorney, Agent, or Firm*—Dennis C. Skarvan; William C. Perry

[57] ABSTRACT

A door hold-open latch and dual release mechanism includes a first latch for maintaining the door in its closed position and a second latch for maintaining the door in its open position. A first latch release is mounted on the door in a position accessible to an operator located in the cab for releasing the first latch. A second latch release is mounted on the door in a position accessible to an operator located in the cab for releasing the second latch. A third latch release is mounted on the door in a position accessible to an operator located on the ground for also releasing the second latch. The operator can actuate the second latch from either the cab using the second latch release or from ground level using the third latch release. Alternately, the third latch release can also release the first latch, and the operator can actuate the first latch using the third latch release.

15 Claims, 3 Drawing Sheets

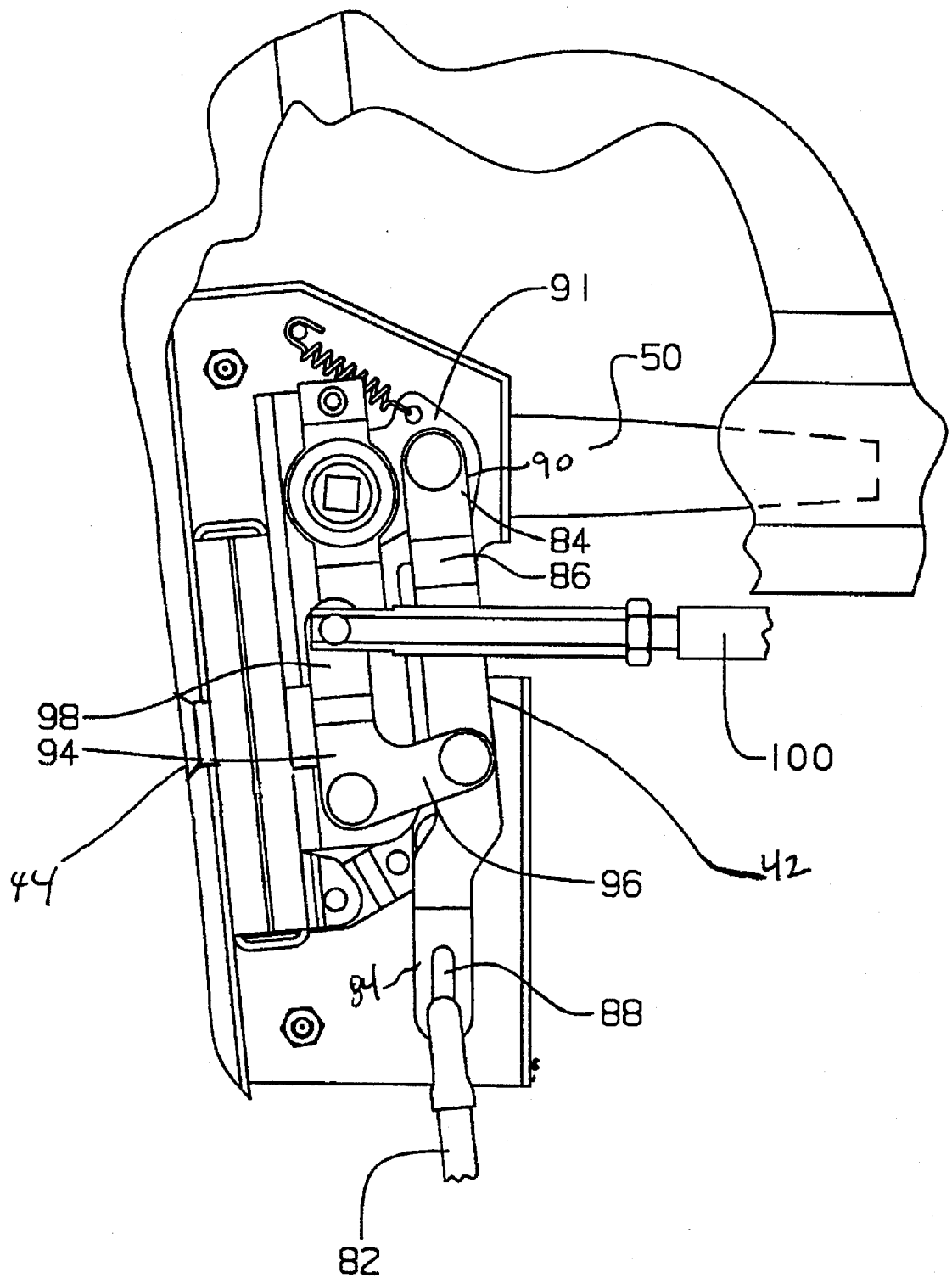
Fig_2_

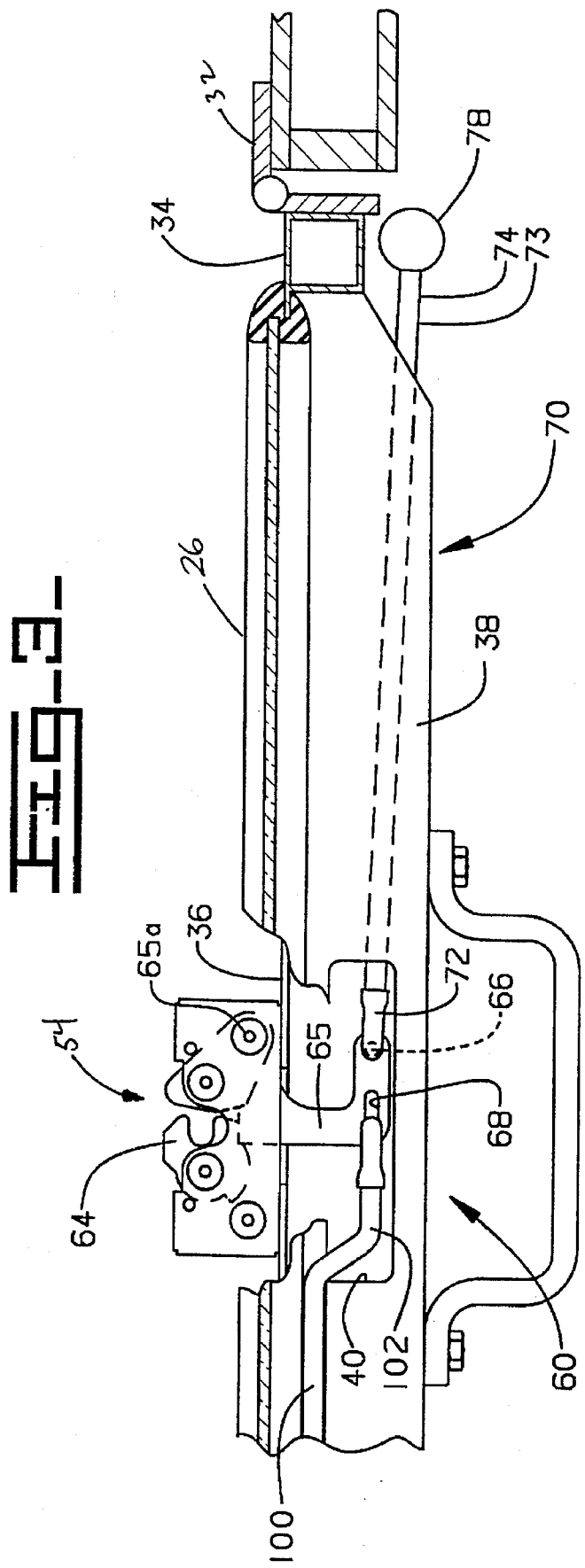

DOOR HOLD-OPEN LATCH RELEASE AND METHOD

TECHNICAL FIELD

This invention relates generally to door latches and more particularly to door hold-open latches and release mechanisms therefor.

BACKGROUND ART

Heavy equipment, such as earthmoving machines, rough terrain lift trucks, mobile cranes and other machines operated out of doors normally include a cab or operator enclosure mounted a considerable distance above ground level. The cab typically includes one or more doors that, when closed, seal the cab during inclement weather. Nevertheless, in certain instances it is desirable for the operator to be able to maintain the door open when operating the equipment. As a result, it is customary to provide some type of self-latching hold-open restraint to catch and hold the door as it is swung toward its open position.

The releases for prior art hold-open restraints are accessible to the operator at either ground level or cab level, but not both. For releases mounted at cab level, an operator at ground level must climb up the machine to release and close the door. Conversely, for releases mounted at ground level, an operator at cab level must climb down the machine to release and close the door. Therefore, in order to quickly and easily release the door hold-open device, it is desired that the door hold-open device be provided having a release accessible to the operator from either at cab level or at ground level.

DISCLOSURE OF THE INVENTION

According to one embodiment of the present invention, a door latching apparatus is disclosed comprising a door pivotable between first and second positions, a first latching member adapted for latching the door in the first position, a first release member operably connected to the first latching member to release the first latching member, a second latching member adapted for latching the door in the second position, a second release member operably connected to the second latching member to release the second latching member, and a third release member operably connected to the second latching member to release the second latching member.

According to another embodiment of the present invention, a method for latching a door is disclosed, comprising the steps of alternately latching a door in first or second positions, actuating a first release mechanism mounted on the door to release the door from the first position, actuating a second release mechanism at a first height relative to the door to release the door from the second position, and actuating a third release mechanism at a second height relative to the door to release the door from the second position.

BRIEF DESCRIPTION OF THE DRAWINGS

FIG. 2 is an exploded view of the door latch of FIG. 1; and

FIG. 3 is partial cross-sectional, exploded view of the hold-open latch of FIG. 1 taken in the direction of the arrows as indicated along line 3—3.

BEST MODE FOR CARRYING OUT THE INVENTION

Figure 1:
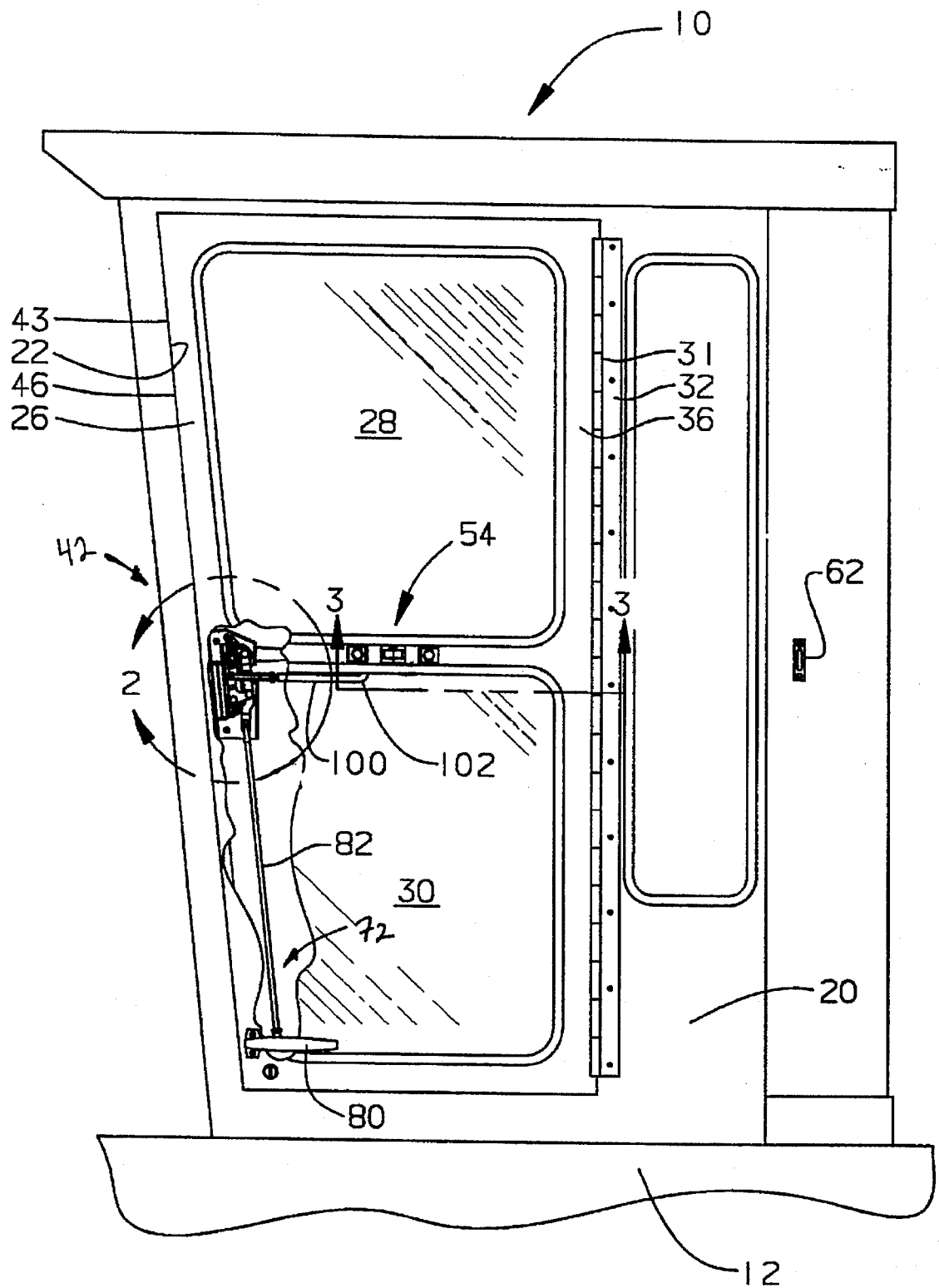
FIG. 1 is a side elevational view of a cab having a door that includes a door latch, a hold-open latch and dual release mechanisms therefor according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIGS. 1 and 3, an enclosure for an operator's station or cab 10 is shown mounted on an earthmoving machine 12. Cab 10 includes a stationary side wall 20 which defines a door opening 22. A door 26, including an upper window 28 and a lower window 30, has a pivotal edge 31 which is connected to a corresponding edge of door opening 22 by a hinge 32. As shown in cross-section in FIG. 3, door 26 is constructed of a tubular frame 34 having an outer panel 36 secured thereto and a U-shaped cross member 38 defining a downwardly facing opening 40 that extends laterally of the door between the windows.

In FIG. 1, a door latching mechanism 42 is shown secured to door 26 adjacent to a free edge 43 and opposite hinge 32. Door latching mechanism 42 is positioned elevationally between the upper and lower ends of door 26 at a height which is easily accessible to the operator when seated in the cab. A conventional door latch striker 44 is secured to side wall 20 at an edge 46 of door opening 22 so as to be adjacent to the free edge 43 of door 26 when closed. Door latching mechanism 42 is positioned to engage door latch striker 44 and hold door 26 in its closed position. As shown in FIG. 2, door latching mechanism 42 includes a release member 50 in the form of a door handle 50 which when operated releases the door latching mechanism 42 from the door latch striker in a conventional manner to permit opening of the door.

Referring back to FIGS. 1 and 3, a door hold-open latching mechanism 54 is shown centrally secured to the exterior of door 26 and positioned elevationally between windows 28 and 30. However, it should be understood that latching mechanism 54 may be located at any appropriate position to achieve the objective of the invention and to correspond with the chosen structure of the door and the enclosure. Latching mechanism 54 engages with a hold-open striker 62 to hold door 26 in its open position. Latching mechanism 54 includes an upper release member 73 in the form a pull rod and a lower release member 80 in the form of a handle. As discussed hereinafter in greater detail, when operated members 73 and 80 release latching mechanism 54 from striker 62 to permit closing of the door.

In FIG. 3, latching mechanism 54 is shown in greater detail. Latching mechanism 54 includes a latching member 64 in the form of a conventional pivotal pawl. A releasing lever 65 is positioned to restrain the pawl 64 in its latched position, as shown in FIG. 3, and is pivotable about a pin 65a to a second position to release the pawl. In FIG. 1, striker 62 is secured to stationary wall 20 in a corresponding location to engage the latching member 64 when door 26 is pivoted to its fully open position. It should be understood, however, that striker 62 may be positioned to engage the latching member 64 and maintain the door in any desired position. The hold-open striker 62, in this example, is a generally U-shaped member which may be secured to the wall 20 by conventional means.

In FIG. 3, a hold-open latch releasing mechanism 60 is shown in greater detail. Mechanism 60 includes first release means 70 mounted on the door in a position accessible to an operator located at cab level; i.e., the level of door 26. First release means 70 includes a pull rod 73 which is secured at a connecting end 75 in an opening 66 of releasing lever 65. Rod 73 extends laterally of the door to a point where a distal end 74 is located adjacent to hinge 32. A spherical knob 78 is secured to distal end 74 of rod 73 to assist operation thereof by the operator. The distal end 74 of rod 73 is supported relative to the door by conventional means, such as by a sliding bearing (not shown) attached to the interior of the door 26.

Referring now to FIGS. 1 and 2, a second release means 72 is mounted on door 26 in a position accessible to an operator located at ground level. Second release means 72 includes lower operating handle 80 pivotally supported on door 26. A first link 82 is connected between operating handle 80 and an end 84 of a second link 86 by way of a slot 88 defined therein. Link 86 is connected at its other end 90 to a first rotatable member 91 which is attached to and rotates with door handle 50. Link 86 is further connected between its ends to an arm 96 of a second rotatable member 94. A third link 100 is connected at one end to arm 98 of member 94 and at its other end to slot 68 of releasing lever 65. The third link 100 is disposed below cross-member 38 and includes a portion 102 directed upwardly through opening 40 for connecting to releasing lever 65. It should be recognized that the lower operating handle 80 is also functional to operate the door latch 42 for opening the door 26 from the ground. Similarly, the upper operating handle 50 is functional as well to operate the hold-open latch 54 for closing the door 26 from the cab.

INDUSTRIAL APPLICABILITY

When the operator is ready to enter the machine, the lower operating handle 80 is rotated downward and causes a like movement of link 82 and link 86. Members 91 and 94 are rotated clockwise by the downward movement of link 86 to release latching mechanism 42 and open door 26. Latching mechanism 54 is also released, however, it is not engaged with striker 62 when door 26 is closed.

The operator may choose to leave door 26 in its open position during operation of the machine. To lock door 26 in its open position, the operator pivots door 26 open until latch member 64 engages with striker 62. Latch member 64 depresses inward against releasing lever 65 to rotate lever 65 counter-clockwise to a position sufficient for striker 62 to be received within the slot of the pawl. Lever 65 is spring biased by latching mechanism 42 to return to its closed position (as shown in FIG. 3) after receipt of striker 62, upon which door 26 is latched in its open position.

In its open position, pull rod 73 is readily accessible to an operator in the cab for disengaging latch mechanism 54. As operating handle 78 is pulled, lever 65 rotates counter-clockwise to release pawl 64 so that striker 62 can be disengaged from mechanism 54. Door 26 is then free to swing toward its closed position.

Alternately, the operator may dismount from the machine and then decide to release latching mechanism 54. To do so, handle 80 is rotated downward in the same manner as if to open door 26 from its closed position. As operating handle 80 is rotated downward, link 82 and link 86 similarly move downward. Members 91 and 94 are rotated clockwise by the downward movement of link 86 to release latching mechanism 54 and permit closing of door 26. Latching mechanism 42 is also released, however, it is not engaged with its corresponding striker when door 26 is open.

To minimize the force required to operate the latching mechanisms, slots 68 and 88 are provided. Slot 88 permits the door latch 42 to be actuated by the door handle 50 without moving the first link 82 and the lower operating handle 80. Similarly, slot 68 permits the door latch 42 to be actuated by the door handle 50 without moving lever 65.

The provision of a hold-open latch with dual releases as described herein permits more efficient and less fatiguing operation of the machine since the operator is not required to either mount or dismount the machine to release the hold-open latch 54 to allow closing of the door. The location of a first release means 70 adjacent the operator's station allows the operator to release the latch and close the door while operating the machine. The provision of the second release means 72 adjacent the lower end of the door permits the operator to release the latch and close the door from or near ground level when the operator is not on the machine.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

We claim:

1. A door latching apparatus, comprising:

a door adapted for enclosing an operator enclosure of a machine;

a first latching member mounted to said door, said first latching member being adapted for engaging a first striker mounted to the operator enclosure to maintain said door in a closed position;

a first release member mounted to said door, said first release member being operably connected to said first latching member to disengage said first latching member from the first striker to release said door from said closed position;

a second latching member mounted to said door, said second latching member being adapted for engaging a second striker mounted to the operator enclosure to maintain said door in an open position;

a second release member mounted to said door at a first height, said second release member being operably connected to said second latching member to disengage said second latching member from the second striker to release said door from said open position; and a third release member mounted to said door at a second height, said first latching member operably connected to said second latching member and said third release member, whereupon operation of said third release member operates said first latching member which thereby disengages said second latching member from said second striker to release said door from said open position.

2. The door latching apparatus of claim 1 wherein said first height is above said second height whereby said second release member is within reach of an operator at the operator enclosure and said third release member is within reach of an operator at ground level.

3. The door latching apparatus of claim 2 wherein said second release member is connected remote said second latching member by a first linkage and said third release member is connected remote from said second latch member by a second linkage.

4. The door latching apparatus of claim 3 wherein said second latching member includes a pivotal pawl adapted for engaging the second striker as said door is pivoted to said open position.

5. The door latching apparatus of claim 4 wherein said first linkage includes a pivotable lever adapted for engaging said pivotable pawl to release the second striker from said pawl and a pull rod connected to said pivotable lever and extending laterally outward therefrom toward the operator enclosure when said door is in said open position.

6. The door latching apparatus of claim 4 wherein said second linkage includes a pivotable lever adapted for engaging said pivotable pawl to release the second striker from said pawl and a first link member extending upward between said third release member and said first latching member and a second link member extending laterally between said first latching member and said pivotable lever.

7. The door latching apparatus of claim 1, wherein said first release member and said second release member are mounted on an inner surface of said door and said third release member is mounted on an outer surface of said door.

8. The door latching apparatus of claim 1, wherein said third release member is operably connected to said first latching member to disengage said first latching member from the first striker to release said door from said closed position.

9. A door latching apparatus, comprising:
a door pivotable between first and second positions;
a first latching member adapted for latching said door in said first position;
a first release member operably connected to said first latching member to release said first latching member;
a second latching member adapted for latching said door in said second position;
a second release member operably connected to said second latching member to release said second latching member; and
a third release member operably connected to said first latching member and said second latching member to release said first latching member and said second latching member.

10. The door latching apparatus of claim 9 wherein said second release member is positioned above said third release member.

11. The door latching apparatus of claim 10 wherein said second release member is connected remote said second latching member by a first linkage and said third release member is connected remote from said second latch member by a second linkage.

12. The door latching apparatus of claim 11 wherein said second latching member includes a pivotal pawl.

13. The door latching apparatus of claim 12 wherein said first linkage includes a pivotable lever adapted for engaging said pivotable pawl and a pull rod connected to said pivotable lever and extending laterally outward therefrom.

14. The door latching apparatus of claim 12 wherein said second linkage includes a pivotable lever adapted for engaging said pivotable pawl and a first link member extending upward between said third release member and said first latching member and a second link member extending laterally between said first latching member and said pivotable lever.

15. The door latching apparatus of claim 12, wherein said first release member and said second release member are mounted on an inner surface of said door and said third release member is mounted on an outer surface of said door.

* * * * *